US008719145B2

(12) United States Patent
O'Connell et al.

(10) Patent No.: US 8,719,145 B2
(45) Date of Patent: *May 6, 2014

(54) SYSTEM AND METHOD FOR CREATING AND TRADING A DERIVATIVE INVESTMENT INSTRUMENT OVER A RANGE OF INDEX VALUES

(75) Inventors: Marty O'Connell, Hinsdale, IL (US); John Hiatt, Jr., Woodridge, IL (US); William Speth, Evanston, IL (US)

(73) Assignee: Chicago Board Options Exchange, Incorporated, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/422,536

(22) Filed: Mar. 16, 2012

(65) Prior Publication Data

US 2012/0323755 A1 Dec. 20, 2012

Related U.S. Application Data

(63) Continuation of application No. 11/849,835, filed on Sep. 4, 2007, now Pat. No. 8,165,953.

(51) Int. Cl.
*G06Q 40/00* (2012.01)
(52) U.S. Cl.
USPC ............... 705/37; 705/35; 705/36; 705/36 R; 385/128
(58) Field of Classification Search
USPC ................... 705/35, 36, 36 R, 37; 385/128
See application file for complete search history.

(56) References Cited

U.S. PATENT DOCUMENTS

| 3,573,747 A | 4/1971 | Adams et al. |
| 3,581,072 A | 5/1971 | Nymeyer |
| 4,412,287 A | 10/1983 | Braddock, III |
| 4,674,044 A | 6/1987 | Kalmus et al. |
| 4,903,201 A | 2/1990 | Wagner |
| 4,980,826 A | 12/1990 | Wagner |
| 5,038,284 A | 8/1991 | Kramer |
| 5,101,353 A | 3/1992 | Lupien et al. |
| 5,136,501 A | 8/1992 | Silverman et al. |

(Continued)

FOREIGN PATENT DOCUMENTS

| EP | 0 752 135 | 2/1999 |
| EP | 0 952 536 A1 | 10/1999 |

(Continued)

OTHER PUBLICATIONS

Office Action issued in U.S. Appl. No. 12/112,605, dated Jun. 17, 2009 (12 pages).

(Continued)

*Primary Examiner* — Muhammad Shafi
*Assistant Examiner* — Sanjeev Malhotra
(74) *Attorney, Agent, or Firm* — Brinks Gilson & Lione

(57) ABSTRACT

An investment instrument based on a range of index values is disclosed that allows investors to take risk positions relative to the size, or length, of the range. The investment instrument has a monetary value that increases as the index value increases within a low range interval of the range, decreases as the index value increases within a high range interval of the range, and is fixed or capped if the index value falls within a middle range interval of the range. Typically, one settlement amount will be zero and the other will be an amount greater than the investment instrument price.

19 Claims, 5 Drawing Sheets

(56) References Cited

U.S. PATENT DOCUMENTS

| | | |
|---|---|---|
| 5,297,031 A | 3/1994 | Gutterman et al. |
| 5,297,032 A | 3/1994 | Trojan et al. |
| 5,305,200 A | 4/1994 | Hartheimer et al. |
| 5,315,634 A | 5/1994 | Tanaka et al. |
| 5,557,517 A | 9/1996 | Daughterty, III |
| 5,664,115 A | 9/1997 | Fraser |
| 5,689,652 A | 11/1997 | Lupien et al. |
| 5,715,402 A | 2/1998 | Popolo |
| 5,744,877 A | 4/1998 | Owens |
| 5,774,877 A | 6/1998 | Patterson, Jr. et al. |
| 5,787,402 A | 7/1998 | Potter et al. |
| 5,793,301 A | 8/1998 | Patterson, Jr. et al. |
| 5,797,002 A | 8/1998 | Patterson, Jr. et al. |
| 5,809,483 A | 9/1998 | Broka et al. |
| 5,813,009 A | 9/1998 | Johnson et al. |
| 5,819,237 A | 10/1998 | Garman |
| 5,845,266 A | 12/1998 | Lupien et al. |
| 5,873,071 A | 2/1999 | Ferstenberg et al. |
| 5,905,974 A | 5/1999 | Fraser et al. |
| 5,913,202 A | 6/1999 | Motoyama |
| 5,915,209 A | 6/1999 | Lawrence |
| 5,915,245 A | 6/1999 | Patterson, Jr. et al. |
| 5,924,082 A | 7/1999 | Silverman et al. |
| 5,950,176 A | 9/1999 | Keiser et al. |
| 5,950,177 A | 9/1999 | Lupien et al. |
| 5,963,923 A | 10/1999 | Garber |
| 5,970,479 A | 10/1999 | Shepherd |
| 5,978,779 A | 11/1999 | Stein et al. |
| 6,012,046 A | 1/2000 | Lupien et al. |
| 6,014,627 A | 1/2000 | Togher et al. |
| 6,014,643 A | 1/2000 | Minton |
| 6,016,483 A | 1/2000 | Rickard et al. |
| 6,018,722 A | 1/2000 | Ray et al. |
| 6,021,397 A | 2/2000 | Jones et al. |
| 6,035,288 A | 3/2000 | Solomon |
| 6,076,068 A | 6/2000 | DeLapa et al. |
| 6,119,103 A | 9/2000 | Basch et al. |
| 6,195,647 B1 | 2/2001 | Martyn et al. |
| 6,199,050 B1 | 3/2001 | Alaia et al. |
| 6,230,146 B1 | 5/2001 | Alaia et al. |
| 6,247,000 B1 | 6/2001 | Hawkins et al. |
| 6,263,321 B1 | 7/2001 | Daughtery, III |
| 6,266,651 B1 | 7/2001 | Woolston |
| 6,269,346 B1 | 7/2001 | Cristofich et al. |
| 6,272,474 B1 | 8/2001 | Garcia |
| 6,278,982 B1 | 8/2001 | Korhammer et al. |
| 6,282,521 B1 | 8/2001 | Howorka |
| 6,285,989 B1 | 9/2001 | Shoham |
| 6,317,727 B1 | 11/2001 | May |
| 6,317,728 B1 | 11/2001 | Kane |
| 6,321,212 B1 | 11/2001 | Lange |
| 6,377,940 B2 | 4/2002 | Tilfors et al. |
| 6,405,180 B2 | 6/2002 | Tilfors et al. |
| 6,421,653 B1 | 7/2002 | May |
| 6,493,682 B1 | 12/2002 | Horrigan et al. |
| 6,505,174 B1 | 1/2003 | Keiser et al. |
| 6,505,175 B1 | 1/2003 | Silverman et al. |
| 6,539,362 B1 | 3/2003 | Patterson, Jr. et al. |
| 6,560,580 B1 | 5/2003 | Fraser et al. |
| 6,564,192 B1 | 5/2003 | Kinney, Jr. et al. |
| 6,601,627 B2 | 8/2003 | Kasai et al. |
| 6,618,707 B1 | 9/2003 | Gary |
| 6,622,129 B1 * | 9/2003 | Whitworth ...................... 705/37 |
| 6,647,374 B2 | 11/2003 | Kansal |
| 7,039,610 B2 | 5/2006 | Morano et al. |
| 7,047,218 B1 | 5/2006 | Wallman |
| 7,072,554 B2 * | 7/2006 | Watanabe et al. ............ 385/128 |
| 7,085,738 B2 | 8/2006 | Tarrant |
| 7,099,839 B2 | 8/2006 | Madoff et al. |
| 7,225,153 B2 | 5/2007 | Lange |
| 7,233,922 B2 | 6/2007 | Asher et al. |
| 7,246,093 B1 | 7/2007 | Katz |
| 7,260,554 B2 | 8/2007 | Morano et al. |
| 7,296,025 B2 | 11/2007 | Kung et al. |
| 7,333,950 B2 | 2/2008 | Shidler et al. |
| 7,389,264 B2 | 6/2008 | Kemp, II et al. |
| 7,451,104 B1 * | 11/2008 | Hendrix et al. ................. 705/35 |
| 7,613,650 B2 | 11/2009 | Smith et al. |
| 7,818,225 B2 * | 10/2010 | Gula, IV ........................ 705/35 |
| 2001/0016819 A1 | 8/2001 | Kolls |
| 2001/0032207 A1 | 10/2001 | Hartley et al. |
| 2002/0002530 A1 | 1/2002 | May |
| 2002/0013760 A1 | 1/2002 | Arora et al. |
| 2002/0019799 A1 | 2/2002 | Ginsberg et al. |
| 2002/0026402 A1 | 2/2002 | Okamura |
| 2002/0032629 A1 | 3/2002 | Siegel, Jr. et al. |
| 2002/0032638 A1 | 3/2002 | Arora et al. |
| 2002/0052816 A1 | 5/2002 | Clenaghan et al. |
| 2002/0077178 A1 | 6/2002 | Oberberger et al. |
| 2002/0077893 A1 | 6/2002 | Wolf et al. |
| 2002/0082967 A1 | 6/2002 | Kaminsky et al. |
| 2002/0087365 A1 | 7/2002 | Kavanaugh |
| 2002/0087454 A1 | 7/2002 | Calo et al. |
| 2002/0099640 A1 | 7/2002 | Lange |
| 2002/0103738 A1 | 8/2002 | Griebel et al. |
| 2002/0107784 A1 | 8/2002 | Hancock et al. |
| 2002/0128952 A1 | 9/2002 | Melkomian et al. |
| 2002/0138401 A1 | 9/2002 | Allen et al. |
| 2002/0147670 A1 | 10/2002 | Lange |
| 2002/0152152 A1 | 10/2002 | Abdelnur et al. |
| 2002/0156716 A1 | 10/2002 | Adatia |
| 2002/0156718 A1 | 10/2002 | Olsen et al. |
| 2002/0161684 A1 * | 10/2002 | Whitworth ...................... 705/36 |
| 2002/0198813 A1 | 12/2002 | Patterson, Jr. et al. |
| 2003/0004858 A1 | 1/2003 | Schmitz et al. |
| 2003/0009411 A1 | 1/2003 | Ram et al. |
| 2003/0018567 A1 | 1/2003 | Flitcroft et al. |
| 2003/0018569 A1 | 1/2003 | Eisenthal et al. |
| 2003/0018572 A1 | 1/2003 | Beschle et al. |
| 2003/0028462 A1 | 2/2003 | Fuhrman et al. |
| 2003/0028468 A1 | 2/2003 | Wong et al. |
| 2003/0033205 A1 | 2/2003 | Nowers et al. |
| 2003/0033240 A1 | 2/2003 | Balson et al. |
| 2003/0083908 A1 | 5/2003 | Steinmann |
| 2003/0093352 A1 * | 5/2003 | Muralidhar et al. ............ 705/36 |
| 2003/0097319 A1 | 5/2003 | Moldovan et al. |
| 2003/0097325 A1 | 5/2003 | Friesen et al. |
| 2003/0115128 A1 | 6/2003 | Lange et al. |
| 2003/0135410 A1 | 7/2003 | Chapman et al. |
| 2003/0139998 A1 | 7/2003 | Gilbert et al. |
| 2003/0149662 A1 | 8/2003 | Shore |
| 2003/0167175 A1 | 9/2003 | Salom |
| 2003/0172026 A1 | 9/2003 | Tarrant |
| 2003/0177077 A1 | 9/2003 | Norman |
| 2003/0182220 A1 | 9/2003 | Galant |
| 2003/0208430 A1 | 11/2003 | Gershon |
| 2003/0220865 A1 | 11/2003 | Lutnick |
| 2003/0225657 A1 | 12/2003 | Whaley et al. |
| 2003/0225658 A1 | 12/2003 | Whaley |
| 2003/0236738 A1 | 12/2003 | Lange et al. |
| 2004/0002906 A1 | 1/2004 | Von Drehnen et al. |
| 2004/0019554 A1 | 1/2004 | Merold et al. |
| 2004/0024681 A1 | 2/2004 | Moore et al. |
| 2004/0030630 A1 | 2/2004 | Tilfors et al. |
| 2004/0083158 A1 | 4/2004 | Addison et al. |
| 2004/0088242 A1 | 5/2004 | Ascher et al. |
| 2004/0103050 A1 | 5/2004 | Long |
| 2004/0111358 A1 * | 6/2004 | Lange et al. ..................... 705/37 |
| 2004/0117284 A1 | 6/2004 | Speth |
| 2004/0133439 A1 | 7/2004 | Noetzold et al. |
| 2004/0158520 A1 | 8/2004 | Noh |
| 2004/0199450 A1 | 10/2004 | Johnston et al. |
| 2004/0215538 A1 | 10/2004 | Smith et al. |
| 2004/0236636 A1 | 11/2004 | Lutnick et al. |
| 2004/0236648 A1 | 11/2004 | Yip et al. |
| 2004/0267657 A1 | 12/2004 | Hecht |
| 2005/0027643 A1 | 2/2005 | Amaitis et al. |
| 2005/0044019 A1 | 2/2005 | Novick et al. |
| 2005/0049948 A1 | 3/2005 | Fuscone |
| 2005/0075961 A1 | 4/2005 | McGill |
| 2005/0097027 A1 | 5/2005 | Kavanaugh |
| 2005/0119962 A1 | 6/2005 | Bowen et al. |
| 2005/0125326 A1 | 6/2005 | Nangalia et al. |
| 2005/0131789 A1 | 6/2005 | Mintz |

(56) References Cited

U.S. PATENT DOCUMENTS

| | | | |
|---|---|---|---|
| 2005/0144104 A1 | 6/2005 | Kastel | |
| 2005/0149428 A1 | 7/2005 | Gooch et al. | |
| 2005/0165669 A1 | 7/2005 | Montanaro et al. | |
| 2005/0198008 A1 | 9/2005 | Adler | |
| 2005/0209945 A1 | 9/2005 | Ballow et al. | |
| 2005/0216384 A1 | 9/2005 | Partlow et al. | |
| 2005/0228747 A1 | 10/2005 | Gumport | |
| 2005/0267833 A1 | 12/2005 | Brodersen et al. | |
| 2006/0008016 A1 | 1/2006 | Balakrishnan et al. | |
| 2006/0036531 A1 | 2/2006 | Jackson et al. | |
| 2006/0100949 A1 | 5/2006 | Whaley et al. | |
| 2006/0106700 A1 | 5/2006 | Boren et al. | |
| 2006/0106713 A1 | 5/2006 | Tilly et al. | |
| 2006/0111956 A1 | 5/2006 | Whitesage | |
| 2006/0143099 A1 | 6/2006 | Partlow et al. | |
| 2006/0149659 A1 | 7/2006 | Carone et al. | |
| 2006/0167788 A1 | 7/2006 | Tilly et al. | |
| 2006/0167789 A1 | 7/2006 | Tilly et al. | |
| 2006/0184438 A1* | 8/2006 | McDow | 705/35 |
| 2006/0253354 A1 | 11/2006 | O'Callahan | |
| 2006/0253355 A1 | 11/2006 | Shalen | |
| 2006/0253359 A1 | 11/2006 | O'Callahan | |
| 2006/0253367 A1 | 11/2006 | O'Callahan et al. | |
| 2006/0253368 A1 | 11/2006 | O'Callahan et al. | |
| 2006/0253369 A1 | 11/2006 | O'Callahan | |
| 2006/0253370 A1 | 11/2006 | Feuser et al. | |
| 2006/0287953 A1 | 12/2006 | Chauhan | |
| 2007/0011081 A1 | 1/2007 | Bok et al. | |
| 2007/0043770 A1 | 2/2007 | Goodrich et al. | |
| 2007/0078740 A1 | 4/2007 | Landle et al. | |
| 2007/0106583 A1 | 5/2007 | Hiatt, Jr. et al. | |
| 2007/0106585 A1 | 5/2007 | Miller | |
| 2007/0112659 A1 | 5/2007 | Shalen et al. | |
| 2007/0172352 A1 | 7/2007 | Chiang | |
| 2007/0282758 A1 | 12/2007 | Vischer et al. | |
| 2008/0040777 A1 | 2/2008 | Aihara et al. | |
| 2008/0059356 A1 | 3/2008 | Brodsky et al. | |
| 2008/0065560 A1 | 3/2008 | Bloom | |
| 2008/0082436 A1* | 4/2008 | Shalen et al. | 705/36 R |
| 2008/0120249 A1 | 5/2008 | Hiatt | |
| 2008/0120250 A1 | 5/2008 | Hiatt, Jr. | |
| 2008/0154790 A1 | 6/2008 | Hiatt | |
| 2008/0168004 A1* | 7/2008 | Kagarlis et al. | 705/36 R |
| 2008/0183640 A1 | 7/2008 | Shalen | |
| 2008/0243676 A1 | 10/2008 | Smith | |
| 2008/0313095 A1 | 12/2008 | Shalen | |
| 2009/0063364 A1 | 3/2009 | O'Connell et al. | |
| 2009/0182684 A1 | 7/2009 | Shalen | |
| 2010/0005032 A1 | 1/2010 | Whaley et al. | |
| 2010/0153254 A1 | 6/2010 | Shalen | |

FOREIGN PATENT DOCUMENTS

| | | |
|---|---|---|
| WO | 00/28449 | 5/2000 |
| WO | 00/48053 | 8/2000 |
| WO | 00/57307 A1 | 9/2000 |
| WO | 00/70506 | 11/2000 |
| WO | 01/22263 | 3/2001 |
| WO | 01/22269 | 3/2001 |
| WO | 01/22313 | 3/2001 |
| WO | 01/22315 | 3/2001 |
| WO | 01/22332 | 3/2001 |
| WO | 01/88808 | 11/2001 |
| WO | 02/37396 A2 | 5/2002 |
| WO | 02/077766 A2 | 10/2002 |

OTHER PUBLICATIONS

Office Action issued in U.S. Appl. No. 12/112,605, dated Mar. 18, 2010 (16 pages).
SEC Notice, Release No. 34-51107, SR-CBOE-2004-75, Federal Register vol. 70, No. 23, dated Friday, Feb. 4, 2005, pp. 6051-6057.
PCX Plus *The Pacific Exchange*, PCX Plus Overview, Oct. 9, 2003, six pages.
The National Association of Securities Dealer, Inc. "NASD Notice to members" 00-65, Sep. 2000, 5 pages.
Special Study: Payment for Order Flow and Internalization in the Options Markets, www.sec.gov/new/studies/ordpay.htm, printed on Oct. 22, 2001, 39 pages.
Evans et al. "The Effects of Electronic Trading System on Open-outcry Commodity Exchange", Social Science 410, Nov. 1998.
Wang, G. et al. "Information Transmission and Electronic Versus Open Outcry Trading Systems: An Intraday Analysis of E-Mini S&P 500 Futures, S&P 500 Index Futures and S&P 500 Cash Index", paper presented in Thailand on Dec. 3-4, 2001.
Tsang, R. "Open outcry and electronic trading in futures exchanges", Bank of Canada Review, Spring 1999, pp. 21-39.
Elind Computers Private LMTD, "Online Global Trading System for Marketplaces", brochure, 2002.
C. Danis, et al. "Alternatives to an Open Outcry Market: An Issue of Supporting Cooperation in a Competitive Situation", IBM TJ Watson Research Center, USA.
Clemens et al., "Segmentation, differentiation, and flexible pricing: Experiences with information technology and segment-tailored strategies", *Journal of Management Information Systems: JMIS*, vol. 11, No. 2, pp. 9-36, Fall 1994.
"Squeezing the poor", *Guardian*, p. 8, Feb. 11, 1997.
Souter, Gavin, "Bermuda's reinsurers eager to please", *Business Insurance*, vol. 28, No. 44, p. 77, Oct. 31, 1994.
"The Electronic Component", The Options Institute Online Learning Center, obtained at the internet address: http://www.cboe.com/LearnCenter/cboeeducation/Course_02_02/mod_02_03.html.
E. Clemons et al., "Information Technology and Screen-Based Securities Trading: Pricing the Stock and Pricing the Trade", *Management Science*, vol. 43, No. 12, Dec. 1997.
"The Pandora's Box over autoquotes; Industry Trend or Event", *Wall Street & Technology*, Section No. 3, vol. 13, p. 38; ISSN: 1060-989X, Mar. 1997.
"How is a Trade Executed—Limit Order", *Nasdaq*, dated Mar. 7, 2000, One Page.
S. Cosgrove, "Courting Retail, Institutional Customers, CBOE, AMEX Get Creative", *Knight-Ridder Financial News*, Jan. 29, 1993.
Self-Regulatory Organizations: Proposed Rule Change by the Cincinnati Stock Exchange Relating to Small Order Execution Guaranty, 1985 WL 547562; SEC Release No. 22330, Aug. 15, 1985.
A Monitoring Report on the Operation of the Cincinnati Stock Exchange National Securities Trading System, U.S. Securities and Exchanges Commission, May 1981.
A Report on the Operation of the Cincinnati Stock Exchange National Securities Trading System 1978-1981, U.S. Securities and Exchange Commission, Sep. 1982.
CBOT Press Release Entitled "Impressive Project Areg. Provides Extended Opportunity in CBOT Financial Complex", dated Jan. 1995, printed from the Internet at http://web.archive.org/web/19990429192354/finance/wat.ch/SCFOA/bulletin/_0001960.htm on Oct. 31, 2005, 3 pages.
A. Frino et al., Price and Time-Priority Versus Pro-Rata Algorithms in Electronically Traded Futures Markets: Simulation Based Performance Characteristics, Oct. 3, 1998, http://www.sirca.org.au/research/database.html (Document 1998009.pdf).
A. Frino et al., The Liquidity of Automated Exchanges: New Evidence From Germany Bund Futures, vol. 8, Journal of International Financial Markets, Institutions and Money, pp. 225-241 (1998).
Self-Regulatory Organization; Chicago Stock Exchange, Inc.; Order Approving Proposed Rule Change Creating the Chicago Match System (59 F.R. 63141) SEC Release No. 34-35030, 1994 SEC LEXIS 3863, Nov. 30, 1994.
A. Sarker et al., "Electronic Trading on Futures Exchanges," Current Issues in Economics and Finance, Federal Reserve Bank of New York, vol. 4, No. 1, Jan. 1998.
Self-Regulatory Organization; Order Approving Proposed Rule Change and Notice of Filing in Order Granting Accelerated Approval of Amendment No. 2 to the Proposed Rule Change by the Philadelphia Stock Exchange, Inc. Relating to Enhanced Specialist Participation in Parity Options Trades, SEC Release No. 34-35429, 60 F.R. 12802, Mar. 8, 1995.
CBOE Rules, CCH (1989) (Rules 6.45-8.80).

(56) References Cited

OTHER PUBLICATIONS

CBOE Information Circular IC 93-88 (Nov. 18, 1993).
U.S. Congress, Office of Technology Assessment, "Electronic Bulls and Bears: U.S. Securities Markets and Information Technology", OTA-CIT-469 (Washington, DC: U.S. Government Printing Office, Sep. 1990). (selected excerpts).
Self-Regulatory Organizations; Filing and Order Granting Accelerated Approval of Proposed Rule Change by the Chicago Board Options Exchange, Inc., Relating to System Modifications to the Retail Automated Execution System, SEC Release No. 34-32879, vol. 58, No. 182, Sep. 22, 1993, 49342-49343.
CBOE Regulatory Circular RG 91-71, Dec. 25, 1991.
Notice of Receipt of Plan Filed Pursuant to Section 11A(a)(3)(B) of the Securities Exchange Act of 1934, 1980 WL 29398, SEC Release No. 34-16519, Jan. 22, 1980, 7 pages.
New York Stock Exchange Constitution and Rules (Commerce Clearing House, Inc. New York Stock Exchange Guide) Jul. 15, 1965, pp. 2644-2645; 2682-2683.
R. Teweles et al., The Stock Market, Fifth Edition, John Wiley & Sons, 1987, pp. 176-181.
J. Meeker, The Work of the Stock Exchange, The Ronald Press Company 1923, pp. 108-109.
CBOE Information Circular IC91-15, Feb. 25, 1991.
"smartRay.com Delivers Stock Quotes and Financial Information to Wireless Devices for Free!", PR Newswire, p. 2870, Dec. 16, 1999.
Glen, Jack D., "Trading and information systems in two emerging stock markets", East Asian Executive Reports, vol. 16 No. 12, pp. 8, 14, Dec. 15, 1994.
Michaels, Jenna, "NASD's Global Fumble", All Street & Technology, vol. 9 No. 11, pp. 57-62, Jul. 1992.
"PHLX Files Rule Changes to Improve Handling Orders on Pace", Securities Week, p. 5, Jul. 17, 1989.
"NYSE Votes to Restrict Computerized Trading", San Jose Mercury News, Feb. 5, 1988.
SEC Notice, Release No. 34-47959, SR-CBOE-2002-05, Federal Register vol. 68, No. 110, dated Monday, Jun. 9, 2003, pp. 34441-34448.
Original Rule Filing and Amendment No. 1 to SR-CBOE-2002-05, Submitted to SEC on Jan. 16, 2002, 17 pages.
Amendment No. 2 to SR-CBOE-2002-05, Submitted to SEC on May 16, 2002, 21 pages.
Amendment No. 3 to SR-CBOE-2002-05, Submitted to SEC on Jan. 15, 2003, 69 pages.
Amendment No. 4 to SR-CBOE-2002-05, Submitted to SEC on Apr. 3, 2003, 71 pages.
Amendment No. 5 to SR-CBOE-2002-05, Submitted to SEC on May 15, 2003, 3 pages.
Amendment No. 6 to SR-CBOE-2002-05, Submitted to SEC on May 30, 2003, 28 pages.
SEC Notice, Release No. 34-39086, SR-PCX-97-18, Federal Register vol. 62, No. 185, dated Wednesday, Sep. 24, 1997, pp. 50036-50048.
SEC Notice, Release No. 34-47676, SR-CBOE-2002-05, Federal Register vol. 68 No. 77, dated Tuesday, Apr. 22, 2003, pp. 19865-19874.
Co-Pending U.S. Appl. No. 60/986,727, filed Nov. 9, 2007.
SEC Notice, Release No. 34-46803, SR-PCX-2002-36, Federal Register vol. 67 No. 222, dated Monday, Nov. 18, 2002, pp. 69580-69592.
Raithel, Tom, article titled "Major Changes Seen for Exchanges", *Evansville Courier and Press*, Apr. 12, 2000, p. B.6.
Sulima, Cheryl, "Volatility and Variance Swaps", *Capital Markets News*, Federal Reserve Bank of Chicago, Mar. 2001.
Bounds for a Volume Weighted Average Price Option, A. W. Stace, Sep. 24, 2004.
Transitions 1-3, *Transitions Trading* website, retrieved using: www.archive.org Jul. 29, 2004 and Dec. 11, 2004.
Hull, J. and White, A., "The Valuation of Credit Default Swap Options", *Journal of Derivatives*, vol. 10, No. 3, 2003, p. 40.
Duffie, D. and Huang, M., "Swap Rates and Credit Quality", Mar. 31, 1995.
Sodergreen, John, "Product profile: Economic Derivatives in the Energy Sector", *Futures Industry Magazine*, Jan.-Feb. 2005 issue, retrieved from http://www.futuresindustry/org/fi-magazine-home.asp?v=p&q=1018 on May 20, 2008.
Whaley, Robert. "Return and Risk of CBOE Buy Write Monthly Index", *The Journal of Derivatives*, 2002, pp. 35-42.
Chicago Board of Options Exchange, Inc. "Description of the CBOE S & P 500 BuyWrite Index (BXM$^{SM}$)", 5 pages, 2004.
Morgan Stanley, "Global Medium-Term Notes, series F", *Registration statement No. 333117752*, Securities Commission and Exchange, 2004, pp. 22-26.
Chicago Board of Options Exchange, Inc. The New CBOE Volatility Index, 19 pages, 2003.
Vasiliki D. Skintzi, "Implied correlation index: A new measure of diversification", The Journal of Future Markets, Feb. 2005, vol. 25, Iss. 2, pp. 1-3.
Demeterfi, Kresimir, et al., "More Than You Ever Wanted to Know About Volatility Swaps," Goldman Sachs Quantitative Strategies Research Notes, Mar. 1999.
CBOE Futures Exchange letter dated May 17, 2004, to Commodity Futures Trading Commission with accompanying pages containing rules, terms, and conditions for a new product to be traded on the CBOE Futures Exchange, 8 pages.
Press Release article, "CBOE Announces Launch of Futures on VIX: First Tradable Volatility Product Will be Offered on New CBOE Futures Exchange," Sep. 5, 2003, two pages.
Blahnik, Mike, "Internet Opens Up Trading Frontiers", Star Tribune, Metro Edition, Minneapolis, MN, Retrieved from: http://web.archive.org/web/20040322223904/http://www.intrade.com/, dated Jul. 25, 2004.
Wanna Make a Bet?, Laura Bogomolny; Canadian Business, Toronto, Oct. 25-Nov. 7, 2004, vol. 77, Iss. 21.
Office Action issued in U.S. Appl. No. 12/112,605, mailed Mar. 18, 2010 (16 pages).
U.S. Appl. No. 12/575,250, filed Oct. 7, 2009 (36 pages).
Office Action issued in U.S. Appl. No. 12/112,605 on Jun. 17, 2009 (12 pages).
Angel, James J., "How Best to Supply Liquidity to a Small-Capitalization Securities Market", Georgetown University, Jul. 15, 1996, 27 pages.
Domowitz, Ian, "A taxonomy of automated trade execution systems", 12 Journal of Int'l Money and Finance, p. 607-631, dated 1993.

* cited by examiner

SYSTEM AND METHOD FOR CREATING AND TRADING A DERIVATIVE INVESTMENT INSTRUMENT OVER A RANGE OF INDEX VALUES

CROSS-REFERENCE TO RELATED APPLICATIONS

This application is a continuation of U.S. application Ser. No. 11/849,835, filed Sep. 4, 2007, now U.S. Pat. No. 8,165,953, the entirety of which is incorporated herein by reference.

TECHNICAL FIELD

The present disclosure relates to methods of creating and trading derivative contracts whose value depends on the occurrence or non-occurrence of specified events.

BACKGROUND

Traditional derivatives contracts are well known investment instruments. For example, a buyer purchases the right to receive delivery of an underlying commodity or asset on a specified date in the future. Conversely, a seller agrees to deliver the commodity or asset to an agreed location on the specified date. Derivatives contracts, namely futures contracts, originally developed in the trade of agricultural commodities. Large consumers of agricultural products seeking to secure their future supply of raw ingredients like corn, wheat and other commodities would pay in advance for guaranteed delivery in the future. Producers in turn would sell in advance to raise capital to finance the cost of production. The success of agricultural futures soon led to futures activity surrounding other commodities as well. Today futures contracts are traded on everything from pork bellies to memory chips, and from stock shares to market indices.

Over the years derivatives contracts have evolved from simply a means of securing future delivery of a commodity into sophisticated investment instruments. Because derivatives contracts establish a price for the underlying commodity or asset in advance of the date on which the commodity or asset must be delivered, subsequent changes in the price of the underlying asset will inure to the benefit of one party and to the detriment of the other. If the price rises above the derivatives price, the seller is obligated to deliver the commodity or asset at the lower agreed upon price. The buyer may then resell the received product at the higher market price to realize a profit. The seller in effect loses the difference between the derivatives contract price and the market price on the date the goods or assets are delivered. Conversely if the price of the underlying commodity or asset falls below the derivatives price, the seller can obtain the commodity or asset at the lower market price for delivery to the buyer while retaining the higher price. In this case the seller realizes a profit in the amount of the difference between the current market price on the delivery date and the derivatives contract price. The buyer sees an equivalent loss.

As the preceding discussion makes clear, derivatives contracts lend themselves to speculating in price movements of the underlying commodity or asset. Investors may be interested in taking a "long" position in a commodity or asset, buying today at the present price for delivery in the future, in anticipation that prices for the commodity or asset will rise prior to the delivery date. Conversely investors may wish to take a short position, agreeing to deliver the commodity or asset on the delivery date at a price established today, in anticipation of falling prices.

As derivatives contracts have evolved away from merely a mechanism for securing future delivery of a commodity or asset into sophisticated investment instruments, they have become more and more abstracted from the underlying assets on which they are based. For example, whereas derivatives contracts originally required actual delivery of the underlying commodity or asset on the specified delivery date, today's derivatives contracts do not necessarily require assets to change hands. Instead, derivatives contracts may be settled in cash. Rather than delivering the underlying asset, cash settlement requires that the difference between the market price on the delivery date and the contract price be paid by one investor to the other, depending on which direction the market price has moved. If the prevailing market price is higher than the contract price, the investor who has taken a short position in the derivatives contract must pay the difference between the market price on the delivery date and the contract price to the long investor. Conversely, if the market price has fallen, the long investor must pay the difference between the contract price and the market price to the short investor in order to settle the contract.

Cash settlement allows further abstraction of derivatives contracts away from physical commodities or discrete units of an asset such as stock shares. Today derivatives contracts are traded on such abstract concepts as market indices and interest rates. Derivatives contracts on market indices are a prime example of the level of abstraction such contracts have attained. Delivery of the underlying asset is impossible for a derivatives contract based on a market index such as the S&P 500®. No such asset exists. However, cash settlement allows derivatives contracts to be written which allow investors to take positions relative to future movements in the value of an index, or other variable market indicators. A price is established based on a target value of the index on a specified "delivery" date. The difference between the target value price and the actual value of the index (often multiplied by a specified multiplier) is exchanged between the long and short investors in order to settle the contract. Traditionally, cash settlement occurs on the last day of trading for a particular contract. Thus, if the actual value of the index rises above the target value, the short investor must pay to the long investor an amount equal to the difference between the actual value and the target value times the specified multiplier. Conversely if the actual index value falls below the target value, the long investor must pay to the short investor the difference between the actual value and the target value multiplied by the multiplier.

The value of traditional derivatives contracts is inherently tied to the market price or value of the underlying asset and the agreed upon settlement price. The market value of the underlying asset itself, however, may be influenced by any number of external factors. For example, the amount of rainfall in Iowa in June could affect the value of corn futures for September delivery. The latest national productivity report may have a positive or negative impact on options on the S&P 500®. If the share price of a particular company reaches a certain value, it may impact the price investors are willing to pay for derivatives based on that company's shares. The factors that influence the value of traditional derivatives contracts may also have an impact on other investments and assets. For example, if the share price of a market leader in a certain economic sector were to reach a certain value, it may signal to investors that the whole sector is poised for significant growth and may pull up the share price of other companies in the same sector. Likewise, an unexpected change in interest rates by the Federal Reserve may affect share prices broadly throughout the capital markets.

When investors wish to take positions based on the occurrence or non-occurrence of various contingent events that may have broad impact across any number of individual investments, they may take a number of positions in various investments which the investor believes will all be affected in the same way by the occurrence or non-occurrence of a specific event.

SUMMARY

In order to provide for investing based on the occurrence or non-occurrence of certain events, methods for creating and trading derivative contracts over a range of index values, as well as methods and systems for trading such contracts on an exchange, are disclosed. A range option contract is an investment instrument in which investors can take risk positions that have a positive payout if the settlement value of the underlying index falls within a specified range length, detailed herein below, at expiration. In exchange for receiving a predetermined premium price from the long investor, a short investor in a range option contract agrees to pay a settlement amount to the long investor depending on the state of a variable at the expiration of the contract. If the variable is in a first state upon expiration of the option period, the short investor keeps the option price. However, if the variable is in a second state upon expiration of the option period, the short investor pays an amount between $0 and a maximum "capped" amount specified in the contract to the long investor. Typically the settlement amounts will be one of either $0 or some other value greater than the option price. However, the maximum payout amount will be capped and the specific cash settlement amount may vary based on where within a range length (defined herein below) the settlement value of the underlying index value falls. Thus, if the state of the variable is a first value that is outside the length of the rang; the short investor pays nothing to the long investor, and if the variable is a second value the lies within the range, the short investor pays a variable, capped second amount less the option price.

According to a first aspect of the invention, a method for creating such an instrument includes identifying a range length corresponding to a range of index values of an index, determining a range interval, the range interval having a value corresponding to at least a portion of the range length, and creating a derivative investment instrument having a monetary value that increases as the index value increases within a low range interval, decreases as the index value increases within a high range interval, and is fixed or capped if the index value falls a middle range interval.

In another aspect of the invention, a computer-readable memory is described having processor executable program instructions for executing the steps of determining a range length and a range interval, the range length corresponding to a range of index values of an index and the range interval having a value corresponding to at least a portion of the range length; establishing a derivative contract in which an investor will receive one of a first settlement amount and a variable second settlement amount depending on whether a strike price of the derivative contract is less than, within, or greater than the range length; and settling the derivative contract according to whether the strike price of the derivative contract is less than, within, or greater than the range length at expiration of the derivative contract.

In yet another aspect of the invention, an exchange system configured for trading a derivative investment instrument is disclosed. The exchange system includes an interface for receiving an incoming order to purchase the derivative instrument, where the incoming order having a range length and range interval associated therewith. The exchange also includes a book memory for storing previously received orders, the previously received orders each having an associated range length and range interval. A system memory is adapted to store predefined condition parameters for a plurality of predefined states corresponding to a plurality of potential outcomes for the derivative instrument. Additionally, a processor in the exchange is adapted to associate the plurality of previously received orders in the book memory with at least one of the predefined condition parameters, where the predefined condition parameters include at least one parameter for identifying an occurrence of at least one predefined state occurring before expiration of the derivative instrument. The processor is further adapted to calculate a zero payout value for orders having the at least one predefined state that did not occur before an expiration of the derivative instrument and a greater than zero payout value for orders having at least one predefined state that did occur prior to the expiration of the derivative instrument.

Other systems, methods, features and advantages of the invention will be, or will become, apparent to one with skill in the art upon examination of the following figures and detailed description.

DETAILED DESCRIPTION

Figure 1:
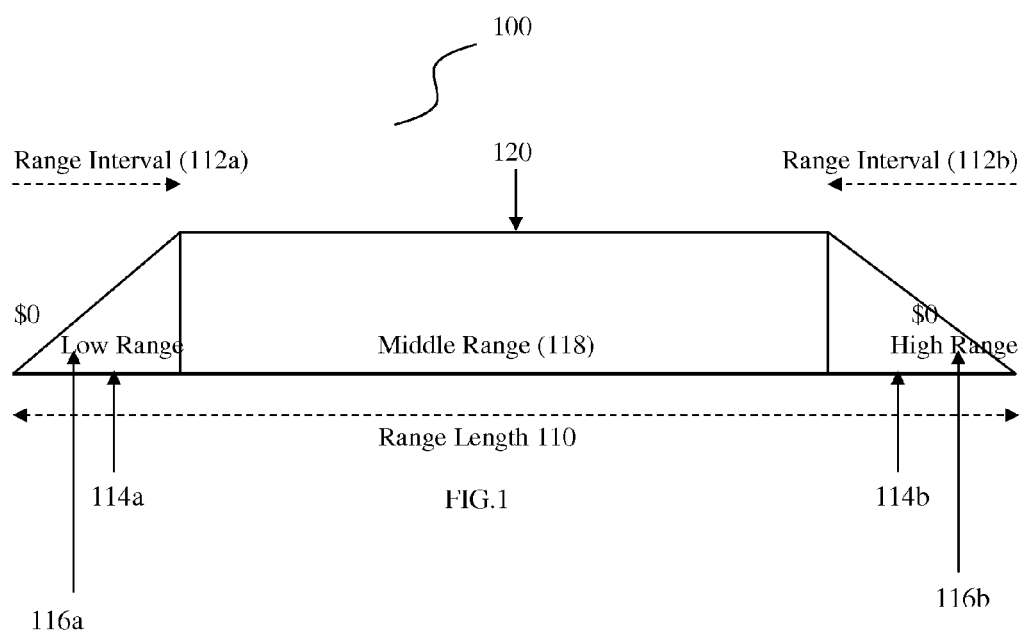
FIG. 1 is a graphical representation of a Range Option contract of the present invention.

The present disclosure relates to a financial instrument in which investors may take positions on the contingent state of a variable at a specified time, and a system for trading such instruments. In one embodiment, the financial instrument may be considered a modified digital, or "range," derivatives contract in that it will settle at or between one of two different settlement amounts in the based on the state of a variable at expiration. As with traditional derivatives contracts, a range contract according to the present invention is a set of mutual promises between two parties—a first investor who desires to take a long position with regard to the eventual state of a particular variable and a second investor who desires to take a short position with regard to the eventual state of the variable. The long investor agrees to pay a certain amount, the derivatives price, to the short investor in exchange for the short investor agreeing to pay to the long investor a settlement amounts depending on the state of the variable when the contract is settled. Typically, one of the possible settlement values will be $0 and another settlement value will be a non-zero capped value greater than the derivatives price.

For the purposes of this specification, the following definitions will be used:

"Range Option" means an option contract having a positive cash settlement amount if the settlement value of the underlying index at expiration falls within the specified Range Length.

"Settlement Value" means the underlying index value at expiration of the Range Option.

"Range Length" means the entire length of the range of values of the underlying index for which the option pays a positive amount if the settlement value of the underlying index falls within the specific Range Length at expiration. An exchange may set the Range Length at listing.

"Range Interval" means an interval amount that determines the range increments of both the Low Range and the High Range. In an embodiment, the minimum Range Interval amount is 5 index points. An exchange may set the Range Interval at listing.

"Low Range and Low Range Exercise Value"—The term "Low Range" means a segment of values along the Range Length (as determined by the Range Interval) that immediately precedes the Middle Range. For a Range Option, if the settlement value of the underlying index at expiration falls within the Low Range, the "Low Range Exercise Value" will be a variable amount that increases along the Low Range as the settlement value of the underlying index at expiration increases and is capped at the Maximum Range Exercise Value.

"High Range and High Range Exercise Value"—The term "High Range" means a segment of values along the Range Length (as determined by the Range Interval) that immediately succeeds the Middle Range. For a Range Option, if the settlement value of the underlying index at expiration falls within the High Range, the "High Range Exercise Value" will be a variable amount that decreases along the High Range as the settlement value of the underlying index increases and is capped at the Maximum Range Exercise Value.

"Middle Range and Maximum Range Exercise Value"—The term "Middle Range" means a segment of values along the Range Length that lies between the Low Range and the High Range and its length is equal to the Range Length minus twice the Range Interval. For a Range Option, if the settlement value of the underlying index at expiration falls within the Middle Range, the "Maximum Range Exercise Value" will be a fixed amount that does not vary based on where in the Middle Range the settlement value of the underlying index falls and represents the maximum payout amount for Range Options. The Exchange sets the Maximum Range Exercise Value at listing "Contract Multiplier" as used in reference to Range Options means the multiple applied to the Low Range Exercise Value, or to the High Range Exercise Value, or to the Maximum Exercise Range Value (as applicable) to arrive at the cash settlement amount per contract. The contract multiplier is established on a class-by-class basis and shall be at least 1 and is preferably expressed in a dollar amount.

"Cash Settlement Amount" as used in reference to a Range Option means the amount of cash that a holder will receive and a writer will be obligated to pay upon automatic exercise of the contract. The cash settlement amount is equal to, as applicable, the Low Range Exercise Value, or to the High Range Exercise Value, or to the Maximum Range Exercise Value times the contract multiplier.

Range Options that are "in-the-money," or "out-of-the-money" are a function of whether the settlement value of the underlying index at expiration falls within or outside of the Range Length. The structure of possible payout amounts for Range Options that are "in-the-money" resembles the shape of an isosceles trapezoid spread over a range of index values or the "Range Length." The Range Length, or the bottom parallel (and longer) line of the trapezoid, defines the entire length of index values for which the option pays a positive amount if the settlement value of the underlying index falls within the specific Range Length. In other words, the Range Length equals the total span between two underlying index values, preferably as set by an exchange at listing, that is used to determine whether a Range option is in or out of the money at expiration.

As illustrated in FIG. 1, the Range Option trapezoid 100 includes Range Length 110 preferably comprised of three segments that are defined by the Range Interval 112, which is a value that is preferably specified at listing. The minimum Range Interval is configurable, and, by way of example, is at least 1 and more preferably 5 index points. As shown in FIG. 1, Range Interval 112 defines a base length 114a, b of each congruent triangle 116a, b on the opposite side of the trapezoid 100, which have base angels of equal degrees and equal base lengths.

The first Range Interval 112 at the beginning of the Range Length 110 defines the Low Range interval 112a for the Range Option and if the settlement value of the underlying index value falls in the Low Range interval 112a (the "Low Range Exercise Value"), the option will pay an amount that increases as the index value increases within the Low Range interval 112a. To determine the cash settlement amount if the settlement value of the index falls within the Low Range interval 112a, the Low Range Exercise Value will be multiplied by a contract multiplier, which may be set by an exchange at listing. Such a contract multiplier may be, for example, a multiplier of or between 1, 10, 20, 50, 100 and so on.

The second Range Interval 112 at the end of the Range Length 110 defines the High Range interval 112b for the Range Option and if the settlement value of the underlying index falls in the High Range, the option will pay an amount that decreases as the index value increases within the High Range interval 112b ("High Range Exercise Value"). To determine the cash settlement amount if the settlement value of index falls within the High Range interval 112b, the High Range Exercise Value will be multiplied by the contract multiplier, which may be set by an exchange at listing. Such a contract multiplier may be, for example, a multiplier of or between 1, 10, 20, 50, 100 and so on. Lastly, the Low Range and High Range intervals 112a, b are segments of equal lengths at opposite ends on the Range Length 110 and if the settlement value of the underlying index falls at the starting value of the Low Range interval 112a, at the ending value of the High Range interval 112b or outside of either the Low Range or the High. Range intervals 112a, b, the option will pay $0.

The third segment of the Range Option is defined as the Middle Range interval 118, and its length is equal to the Range Length 110 minus twice the Range Interval 112; or as illustrated in FIG. 1, the length of the Middle Range interval 118 is equal to the length of the top parallel (and shorter) line 120 of the trapezoid 100. If the settlement value of the underlying index falls anywhere within the Middle Range interval 118 at expiration, the payout is a fixed amount (which may be set by an exchange at listing) and does not vary depending on where in the Middle Range interval 118 the index value falls. The payout if the index value falls in the Middle Range interval 118 is the highest amount that can be paid out for a Range Option and is defined as the "Maximum Range Exercise Value." To determine the cash settlement amount if the settlement value of the index falls anywhere within the Middle Range interval 118, the Maximum Range Exercise Value will be multiplied by the contract multiplier, which may be set by an exchange at listing. Such a contract multiplier may be, for example, a multiplier of or between 1, 10, 20, 50, 100 and so on.

Unlike other options, Range Options will only be of a single type, and there will not be traditional calls and puts.

Additionally, the "strike" price for Range Options will be the Range Length 110 that, similar to a regular strike price, will be used to determine if the Range Option is in or out of the money. When applicable, the "strike price" for a Range Option (i.e., the Range Length 110) will be used to determine the degree that the option is in-the-money (capped at the Maximum Range Exercise Value) if the settlement value of the underlying index falls within either the Low or High Range intervals 112*a, b* of the Range Length 110.

Figure 2:
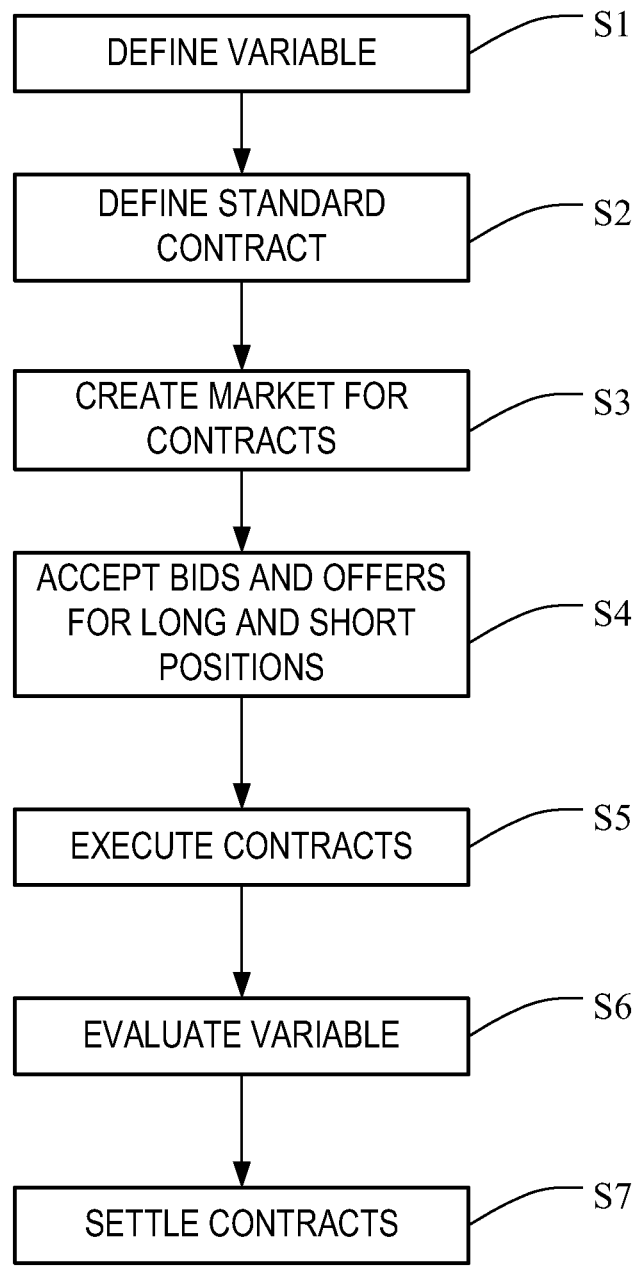
FIG. 2 is a flow chart showing a method of creating a Range Option contract.

FIG. 2 shows a flow chart of a method of creating and trading Range Option contracts according to the present invention. The first step S1 is to define a variable that may take on one of at least two different states at a time in the future (i.e. at expiration). The second step S2 is to define a range options contract. The standard contract will define the variable, establish the first ($0), Low Range, High Range and Middle (or Maximum) Range settlement amounts, and specify the expiration date of the contract. The price for the range options contracts based on the standard contract will be established in the open market. Step S3 is to create a market for the range options contracts. Step S4 is to accept bids, offers and purchase orders for both long and short positions in range options contracts which are to be created according to the standard range options contract. Step S5 is to execute range options contracts by matching corresponding orders for long and short positions. In step S6 the variable is evaluated at the expiration of the contract, and in step S7 the contract is settled.

It is intended that range options contracts according to the present invention will be traded on an exchange. The exchange may be a traditional open outcry exchange, or it may be an electronic trading platform such as the Chicago Board Options Exchange (CBOE) or Chicago Board Options Exchange Futures Exchange (CFE). Employing the method outlined in FIG. 2, the exchange may from time to time identify variables in which it believes investors will be interested in taking positions. For example, the exchange may determine that investors will be interested in taking positions relative to the movement of 30-year fixed mortgage rates relative to one or more threshold values, or the price of a commodity such as sweet crude oil prices or gold prices, again relative to one or more price thresholds. Alternatively, the exchange may determine that investors are interested in taking positions regarding the movements of a particular index such as the CBOE volatility index (VIX®), relative to certain significant threshold values.

In cases where the variable relates to the price or value of an underlying asset, commodity or market indicator, the step of identifying the variable requires identifying the underlying asset commodity or market indicator as well as defining a threshold value.

Once the variable has been defined, the exchange defines a standard Range Option contract (step S2) based on the defined variable. The standard contract created by the exchange will define the terms of the actual individual contracts that investors will enter when placing orders to take positions in the Range Option contracts. All of the details of the instrument must be spelled out. The variable must be defined; the settlement amounts established; the length of the contract; the date, possibly even the time when the variable will be evaluated; when and where the contracts may be traded; pricing conventions; delivery; and so forth. The trading platform may be, for example, the electronic trading platform CBOEdirect® which allows trading between the hours of 8:30 A.M.-3:15 P.M. Central Standard Time. Contract trading may be limited monthly contracts, i.e., Range Option contracts that settle at the end of each month. The standard contract may set pricing conventions such as the granularity of price increments. A minimum tick size such as $10 may also be established. Further contingencies can be spelled out. Finally, delivery provisions may be spelled out. For example, the buyer may be required to deposit the entire contract price, and the seller the greater of the two settlement amounts less the contract price. The two accounts may then be marked-to-market on a daily basis based on changes in the futures price. However, the accounts may be set up such that investors may not withdraw their funds until the business day after the final settlement date to ensure that sufficient funds are available to cover the contract. An example of Range Option contract specifications is seen in Table 1 below:

TABLE 1

| EXAMPLE CONTRACT SPECIFICTIONS FOR RANGE OPTIONS | |
| --- | --- |
| Symbols: | XYZ |
| Product Description: | Range Options are European-style, cash-settled options that have a positive payout if the settlement value of the underlying index value falls within the specified Range Length at expiration. The maximum payout amount will be capped at listing and the specific cash settlement amount may vary based on where on the Range Length the settlement value of the underlying index value falls. |
| Underlying: | The underlying for a Range Option may be any index eligible for options trading on the Exchange. |
| Low and High Ranges: | Low Range means a segment of values along the Range Length that immediately precedes the Middle Range and the High Range means a segment of values along the Range Length that immediately succeeds the Middle Range. The Range Interval is used to define the Low Range and the High Range, which cover an equal segment of values at opposite ends of the Range Length. |
| Middle Range: | Middle Range means a segment of values along the Range Length that lies between the Low Range and the High Range and its length is equal to the Range Length minus twice the Range Interval. |
| Multiplier: | $100. |
| Range Length/Strike Price: | The Range Length is defined as the entire length of the range of values of the underlying index for which the option pays a positive amount if the settlement value of the underlying index falls within the specified Range Length at expiration. The Exchange sets the Range Length at listing (e.g., 1340 to 1410) |

TABLE 1-continued

EXAMPLE CONTRACT SPECIFICTIONS FOR RANGE OPTIONS

| | |
|---|---|
| | and uses the Range Length to determine whether the option is in or out of the money at expiration. When applicable, the Range Length is used to determine the degree that the option is in-the-money if the settlement value of the underlying index falls within either the Low Range or High Range. |
| Range Interval/ Strike Price Interval: | The Range Interval is defined as an interval amount that determines the range increments of both the Low Range and the High Range. The minimum Range Interval amount is 5 and the Exchange sets the Range Interval at listing. The Range Interval will also serve as the strike price interval. |
| Maximum Range Exercise Value: | The Maximum Range Exercise Value will be a fixed amount set by the Exchange at listing and results in the highest amount that can be paid out for a Range Option. The Maximum Range Exercise Value is used to determine the cash settlement amount if the settlement value of the underlying index falls anywhere within the Middle Range. |
| Expiration Months: | Expiration months for Range Options shall be equivalent to those for options on the same underlying index. |
| Expiration Date: | Saturday following the third Friday of the Expiration Month. |
| Index Settlement Value: | The index settlement value is calculated using the opening (first) reported sales price in the primary market of each component stock on the last business day (usually a Friday) before the expiration date. If a stock in the index does not open on the day on which the exercise settlement value is determined, the last reported sales price in the primary market will be used in calculating the index settlement value. |
| Exercise Style: | European - Range Options may be exercised only on the last business day prior to expiration. Writers are subject to assignment only at expiration. Automatic exercise occurs if the value of the underlying index falls within the Range Length. |
| Last Trading Day: | Trading will ordinarily cease on the business day (usually a Thursday) preceding the day on which the exercise-settlement value of the Range Option is determined (i.e., Low Range Exercise Value, High Range Exercise Value, Maximum Range Exercise Value). |
| Determination of Cash Settlement Amount: | Low Range Exercise Value: to determine the cash settlement amount if the settlement value of the index falls within the Low Range, the Low Range Exercise Value will be multiplied by the contract multiplier. If the settlement value of the index falls within the Low Range, the option will pay an amount that increases as the index value increases within the Low Range. High Range Exercise Value: to determine the cash settlement amount if the settlement value of the index falls within the High Range, the High Range Exercise Value will be multiplied by the contract multiplier. If the settlement value of the index falls within the High Range, the option will pay an amount that decreases as the index value increases within the High Range. Maximum Range Exercise Value: to determine the cash settlement amount if the settlement value of the index falls within the Middle Range, the Maximum Range Exercise Value will be multiplied by the contract multiplier. If the settlement value of the index falls within the Middle Range, the options will pay the same amount, which is also the highest amount that can be paid for a Range Option, |
| Position and Exercise Limits: | Position and exercise limits for Range Options shall be equivalent to those for options on the same underlying index. Range Options are also subject to the same position reporting requirements triggered for options on the same underlying index. Range Options shall not be aggregated with options on the same underlying index and Range Options of a given class shall not be aggregated with any other class of Range Options. |
| Margin: | Customer margin for uncovered writers is the difference between the Maximum Range Exercise Value times the contract multiplier and the proceeds received from the sale of the Range Option. See Rule 12.3(n). |
| Cusip Number: | 123 |
| Trading Hours: | 8:30 a.m. to 3:15 p.m. Chicago time. |
| Trading Platform: | CBOEdirect. |

Step S3 from FIG. 2 may be accomplished by listing one or more defined contracts on an exchange, trading platform or system. Listing a contract includes disseminating information about the contract to potential investors and providing a mechanism whereby investors may make bids and offers and place orders for the contracts. The Range Options of the present example may be traded on the CBOEdirect® electronic trading platform. CBOEdirect is a trading facility which disseminates information regarding contracts traded on the platform, and allows brokers and dealers to place orders for customers who enter bids and make offers to buy and sell positions in such contracts.

The below examples and diagrams demonstrate the variations of payout amounts for Range Options. Assume the Exchange identifies the S&P 500 Index ("SPX") as the underlying index and defines the Range Length as between 1340 and 1410. Also assume that the Exchange sets the Range Interval at 10 index points and the Maximum Range Exercise Value at 100 and the contract multiplier as $100.

Payout if Closing Value of Underlying Index Falls in Low or High Ranges

If at expiration the underlying index value falls in either the Low Range or the High Range, the payout will be determined based on where the settlement value falls within the respective range. If the settlement value falls within the Low Range, the Low Range Exercise Value will equal a value that falls within a progressive upward slope that ends at the beginning of the Middle Range. For example, if the settlement value of the SPX is 1342, the cash settlement amount would be $100 ($100×1) or if the settlement value of the SPX is 1347, the cash settlement would be $700 ($100×7). If at expiration, the settlement value of the SPX is 1340 or lower, the option would expire worthless.

Example 1

Low Range Exercise Value

| 1340 | ◄-------------------- | | | Low Range | | | -------------------► | | 1349 |
|---|---|---|---|---|---|---|---|---|---|
| | | | | Settlement Value of SPX | | | | | |
| 1340 | 1341 | 1342 | 1343 | 1344 | 1345 | 1346 | 1347 | 1348 | 1349 |
| | | | | Low Range Exercise Value | | | | | |
| 0 | 1 | 2 | 3 | 4 | 5 | 6 | 7 | 8 | 9 |

If the settlement value falls within the High Range, the High Range Exercise Value will equal a value that falls within a regressive downward slope that starts at the end of the Middle Range. For example, if the settlement value of the SPX is 1402, the cash settlement amount would be $800 ($100×8) or if the settlement value of the SPX is 1406, the cash settlement would be $400 ($100×4). If at expiration, the settlement value of the SPX is 1410 or higher, the option would expire worthless.

Example 2

High Range Exercise Value

| 1401 | ◄-------------------- | | | High Range | | | -------------------► | | 1410 |
|---|---|---|---|---|---|---|---|---|---|
| | | | | Settlement Value of SPX | | | | | |
| 1401 | 1402 | 1403 | 1404 | 1405 | 1406 | 1407 | 1408 | 1409 | 1410 |
| | | | | High Range Exercise Value | | | | | |
| 9 | 8 | 7 | 6 | 5 | 4 | 3 | 2 | 1 | 0 |

Maximum, Fixed Payout if Underlying Index Value Falls in Middle Range

If at expiration, the settlement value of the SPX is 1351, the option holder would be entitled to receive and the writer would be obligated to pay $1,000 ($100×10) and if the settlement value of the SPX is 1375, the cash settlement amount would also be $1,000. This is because if the settlement value of the SPX falls anywhere within the Middle Range at expiration, the payout is a fixed amount (Maximum Range Exercise Value times the contract multiplier) and does not vary depending on where in the Middle Range the SPX value falls.

Example 3

Underlying Index Value Falls Within Middle Range

| 1340 | ◄---------------- | Range Length | ----------------► | 1410 |
|---|---|---|---|---|
| | Low Range | Middle Range Maximum Range Exercise Value = $100 | High Range | |
| 1340 | 1349 | 1350      1400 SPX = 1351 SPX = 1375 | 1401 | 1410 |

Benefits of Range Options

Range Options provide advantages to the investing public that are not provided for by standard index options. First, Range Options offer investors a relatively low risk security where the risk reduction results from knowing the maximum risk exposure when the contract is written. While there may be variation in the amount of the cash settlement amount, the maximum cash settlement amount is set at listing and the risk is therefore limited and known at listing. Second, Range Options can be structured similar to a two-sided European binary option that provides additional flexibility because the option pays a reduced amount if the underlying index settles outside the main range covered by the option.

Essentially, once a contract is defined and listed, the CBOEdirect® electronic trading platform, in conjunction with other backend systems of the exchange, is responsible for all of the remaining steps of the method 200 shown in FIG. 2. CBOEdirect® accepts bids and offers from investors or brokers (Step S4), and executes marketable orders by matching buyers to sellers (Step S5.) Other backend systems operated by the exchange evaluate the variables (Step S6) and settle the contracts at expiration (Step S7).

Figure 3:
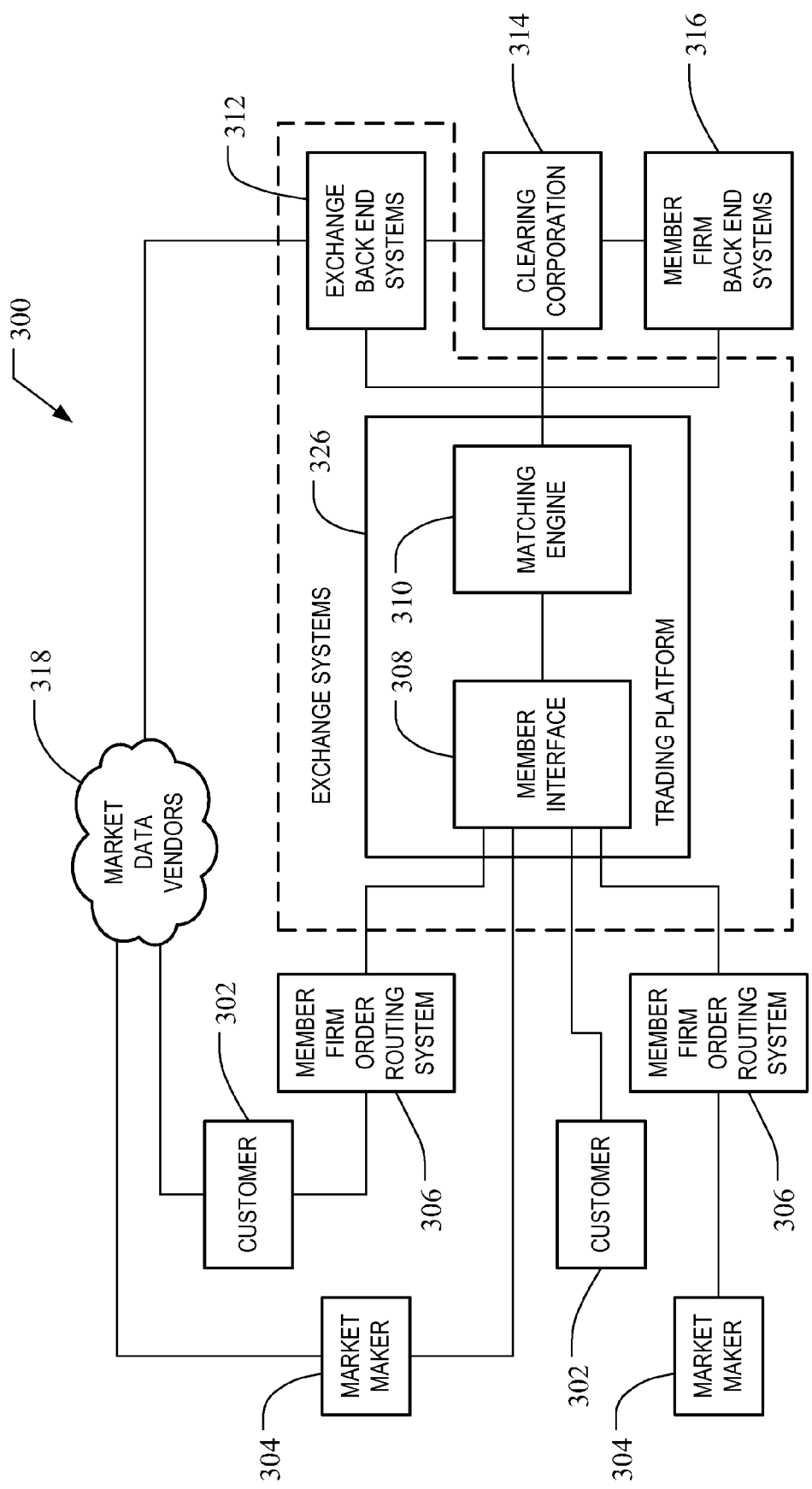
FIG. 3 is a block diagram of a system for trading range option contracts.

FIG. 3 shows an electronic trading system 300 which may be used for listing and trading Range Option contracts. The system 300 includes components operated by an exchange, as well as components operated by others who access the exchange to execute trades. The components shown within the dashed lines are those operated by the exchange. Components outside the dashed lines are operated by others, but nonetheless are necessary for the operation of a functioning exchange. The exchange components of the trading system 300 include an electronic trading platform 320, a member interface 308, a matching engine 310, and backend systems 312. Backend systems which may not necessarily be operated by the exchange but which are typically involved in processing trades and settling contracts are the clearing systems 314, and member firms' backend systems 316. One suitable third party clearing system is the Options Clearing Corporation.

Market makers may access the trading platform 320 directly through personal input devices 304 which communicate with the member interface 308. Market makers may quote prices for Range Option contracts. Non-member customers 302, however, must access the exchange through a member firm. Customer orders are routed through member firm routing systems 306. The member firms' routing systems 306 forward the orders to the exchange via the member interface 308. The member interface 308 manages all communications between the member firm routing systems 306 and market makers' personal input devices 304; determines whether orders may be processed by the trading platform; and determines the appropriate matching engine for processing the orders.

Although only a single matching engine 310 is shown in FIG. 3, the trading platform 320 may include multiple matching engines. Different exchange traded products may be allocated to different matching engines for efficient execution of trades. When the member interface 302 receives an order from a member firm routing system 306, the member interface 308 determines the proper matching engine 310 for processing the order and forwards the order to the appropriate matching engine. The matching engine 310 executes trades by pairing corresponding marketable buy/sell orders. Non-marketable orders are placed in an electronic order book.

Once orders are executed, the matching engine 310 sends details of the executed transactions to the exchange backend systems 312, to the clearing corporation systems 314, and to the member firms' backend systems 316. The matching engine also updates the order book to reflect changes in the market based on the executed transactions. Orders that previously were not marketable may become marketable due to changes in the market. If so, the matching engine 310 executes these orders as well.

The exchange backend systems 312 perform a number of different functions. For example, contract definition and listing data originate with the exchange backend systems 312. Pricing information for Range Option contracts is disseminated from the exchange backend systems to market data vendors 318. Customers 302, market makers 304, and others may access the market data regarding Range Option contracts via, for example, proprietary networks, on-line services, and the like. The exchange backend systems also evaluate the variable(s) on which the Range Option contracts are based. At expiration, the backend systems 312 determine the appropriate settlement amounts and supply final settlement data to the clearing system 314. The clearing system acts as the exchange's bank and performs a final mark-to-market on member firm margin accounts based on the positions taken by the member firms' customers. The final mark-to-market reflects the final settlement amounts for the Range Option and the clearing system 314 debits/credits member firms' accounts accordingly. These data are also forwarded to the member firms' systems 316 so that they may update their customer accounts as well.

Figure 4:
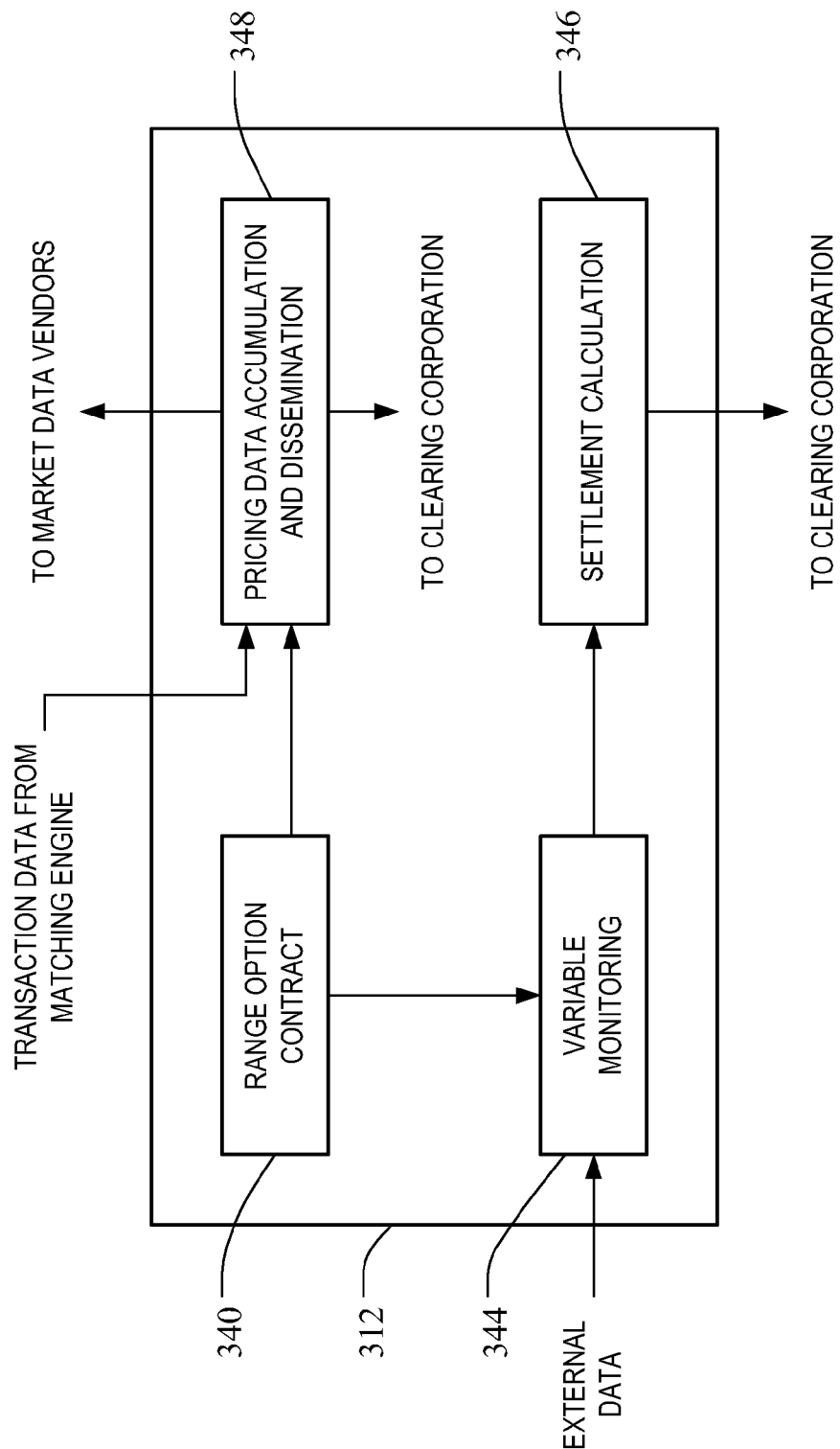
FIG. 4 is a block diagram of exchange backend systems for supporting the trading of range option contracts.

FIG. 4 shows the exchange backend systems 312 for trading Range Option contracts in more detail. A Range Option contract definition module 340 stores all relevant data concerning the Range Option contract to be traded on the trading platform 320, including the contract symbol, the definition of the variable(s), the underlying asset (if there is one) the threshold value, or the event description, etc. A pricing data accumulation and dissemination module 348 receives contract information from the Range Option contract definition module 340 and transaction data from the matching engine 310. The pricing data accumulation and dissemination module 348 provides the market data regarding open bids and offers and recent transactions to the market data vendors 318. The pricing data accumulation and dissemination module 348 also forwards transaction data to the clearing system 314 so that the clearing system may mark-to-market the accounts of member firms at the close of each trading day, taking into account current market prices for the Range Option contracts. Finally, a settlement calculation module 346 receives input from the variable monitoring module 344. On the settlement date the settlement calculation module 346 calculates the settlement amount based on the state of the variable(s). The settlement calculation module 346 forwards the settlement amount to the clearing system, which performs a final mark-to-market on the member firms' accounts to settle the Range Option contract.

In one embodiment, the Range Option contract is a put option contract based on an underlying asset or economic indicator with a strike price as detailed herein above.

In another embodiment, the Range Option contract is a call option contract based on an underlying asset with a strike price with a strike price as detailed herein above.

Figure 5:
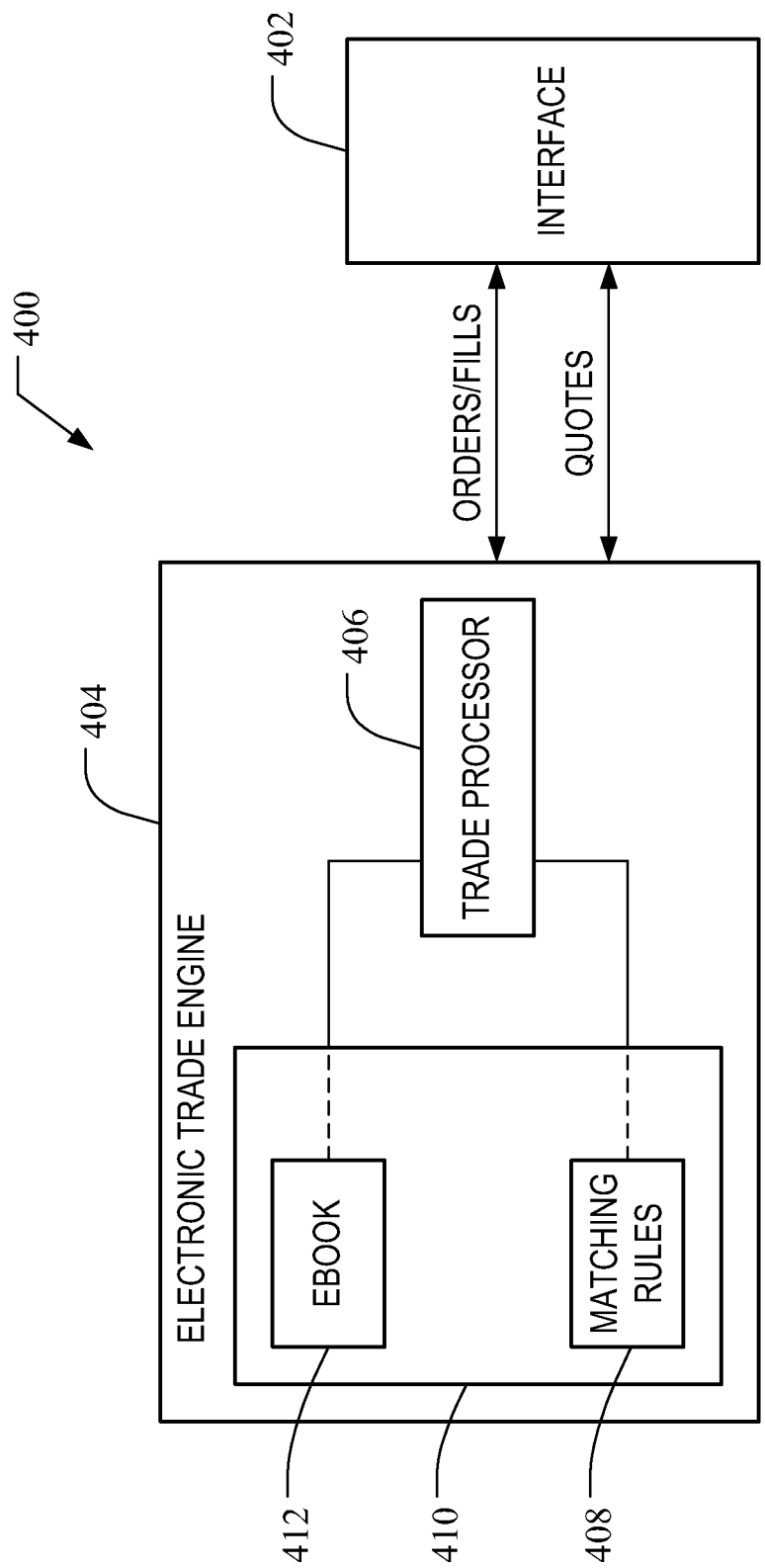
FIG. 5 is a block diagram of an automated exchange system configured for auctioning of range option contracts.

As illustrated in FIG. 5, an automated exchange 400 configured for auctioning of a selected financial instrument by a combination of electronic and open-outcry trading mechanisms is shown. Alternatively, automated exchange 400 could be an automated system on an exchange configured for a combination of electronic and open-outcry trailing mechanisms. Preferably, the automated exchange is based on the exchange system disclosed in U.S. application Ser. No. 10/423,201, filed Apr. 24, 2003, entitled "HYBRID TRADING SYSTEM FOR CONCURRENTLY TRADING SECURITIES OR DERIVATIVES THROUGH BOTH ELECTRONIC AND OPEN-OUTCRY TRADING MECHANISMS," and incorporated in its entirety by reference herein. The automated exchange 400 includes a data interface 402 for receiving an incoming order to purchase the selected financial instrument and routing the order to a electronic trade engine 404 that contains a processor means 406, such as trade processor, that analyzes and manipulates orders according to matching rules 408 stored in a system memory means 410, such as a database, in communication with the processor means 406. The data interface 402 performs various functions, including but not limited to, error checking, data compression, encryption and mediating the exchange of data between the exchange 400 and entities sending orders and/or quotes. Orders and quotations from the market participants are placed on the exchange 400 via the interface 402.

Also included in the electronic trade engine 404 is the electronic book memory means 412 (EBOOK) of orders and quotes with which incoming orders to buy or sell are matched with quotes and orders resting on the EBOOK 412 according to the matching rules 408. The electronic trade engine 404 may be a stand-alone or distributed computer system. Any of a number of hardware and software combinations configured to execute the trading methods described below may be used for the electronic trade engine 404. In one embodiment, the electronic trade engine 404 may be a server cluster consisting of servers available from Sun Microsystems, Inc., Fujitsu Ltd. or other known computer equipment manufacturers. The EBOOK 412 portion of the electronic trade engine 404 may be implemented with Oracle database software and may reside on one or more of the servers comprising the electronic trade engine 404. The rules database 408 may be C++ or java-based programming accessible by, or executable by, the processor means 406.

Preferably, the incoming order has a range length and range interval associated therewith and is stored in the book memory means 412. The book memory means 412 is also for storing previously received orders, which also have a range length and range interval associated therewith. The system memory means 410 is included for storing predefined condition parameters for a plurality of predefined states corresponding to a plurality of potential outcomes for the selected financial instrument (Range Option contract). Additionally, a processor means 406 is included for associating the plurality of previously received orders in the book memory means 412 with at least one of the predefined condition parameters in the system memory means 410. It is preferred that the predefined condition parameters include at least one parameter for identifying an occurrence of at least one predefined state occurring before the expiration time of the Range Option. It is further desirable to have the allocating parameters include parameters for allocating preferentially against orders with larger size, time-priority, or parameters for calculating an allocation percentage based on a formula that allocates the order identified with the at least one market participant. Such a formula may be:

$$X\% = \text{siz}[mp]/(\text{siz}[mp] + \text{siz}[pro])$$

where siz[mp] is the size of the order identified with the at least one market participant, and size[pro] is the sum of the sizes of professional orders not identified with the at least one market participant.

Further, the processor means 406 may be used to calculate a zero payout value for orders having the at least one predefined state that did not occur before an expiration of the derivative investment instrument and a greater than zero payout value for orders having at least one predefined state that did occur prior to the expiration of the derivative instrument.

While various embodiments have been described, it will be apparent to those of ordinary skill in the art that many more embodiments and implementations are possible within the scope of the invention. Accordingly, it is intended that the foregoing detailed description be regarded as illustrative rather than limiting, and that it be understood that the following claims, including all equivalents, are intended to define the scope of this invention.

The invention claimed is:

1. An exchange system configured for trading a derivative investment instrument, the exchange system comprising:
   an interface for receiving an incoming order to purchase the derivative investment instrument, the derivative investment instrument having a fixed length payout range associated therewith, wherein the fixed length payout range comprises a plurality of values of a variable for which the derivative investment instrument pays a positive amount if a settlement value of the variable falls within the fixed length payout range at expiration of the derivative investment instrument;
   a book memory configured to store a plurality of previously received orders, the plurality of previously received orders each having the fixed length payout range associated therewith;
   a system memory configured to store predefined condition parameters for a plurality of potential outcomes for the derivative investment instrument; and
   a processor adapted to:
      associate the plurality of previously received orders in the book memory with at least one of the predefined condition parameters, wherein the predefined condition parameters include at least one parameter for identifying an occurrence of at least one variable value falling within the fixed length payout range before an expiration of the derivative investment instrument; and
      calculate a zero payout value for orders having the at least one variable value that did not fall within the fixed length payout range before the expiration of the derivative investment instrument and a greater than zero payout value for orders having at least one variable value that did fall within the fixed length payout range prior to or at the expiration of the derivative investment instrument.

2. The exchange system of claim 1, wherein the system memory further comprises allocating parameters for allocating orders among market participants.

3. The exchange system of claim 2, wherein the processor is further configured to allocate the previously received orders based on the allocating parameters in the system memory and wherein the allocating parameters include parameters for allocating preferentially against orders with larger size.

4. The exchange system of claim 3 wherein the derivative investment instrument comprises an option contract.

5. The exchange system of claim 3, wherein the derivative investment instrument comprises a futures contract.

6. The exchange system of claim 3, further comprising a clearing system in communication with the processor, the clearing system adapted to settle the derivative instrument.

7. The exchange system of claim 1, wherein the variable comprises an underlying asset.

8. The exchange system of claim 1, wherein the variable comprises an underlying commodity.

9. The exchange system of claim 1, wherein the variable comprises an underlying market indicator.

10. The exchange system of claim 1, wherein the fixed length payout range comprises a plurality of segments, wherein:
    in a first segment of the fixed length payout range the processor is configured to calculate a payout amount for the derivative investment instrument that increases as a value of the variable increases;
    in a second segment of the fixed length payout range the processor is configured to calculate a payout amount for the derivative investment instrument that decreases as the value of the variable increases; and
    in a third segment of the fixed length payout range the processor is configured to calculate a fixed payout amount for the derivative investment instrument.

11. The exchange system of claim 10, wherein the third segment comprises a third set of values of the variable that is between a first set of values of the variable associated with the first segment and a second set of values of the variable associated with the second segment.

12. The exchange system of claim 1, wherein the variable comprises an index.

13. A method for trading a derivative investment instrument, the method comprising:
    in an exchange system having an interface for receiving an incoming order to purchase the derivative investment instrument, the derivative investment instrument having a fixed length payout range associated therewith, wherein the fixed length payout range comprises a plurality of values of a variable for which the derivative investment instrument pays a positive amount if a settlement value of the variable falls within the fixed length payout range at expiration of the derivative investment instrument, a book memory for storing a plurality of previously received orders, a system memory for storing predefined condition parameters for a plurality potential outcomes for the derivative investment instrument, and a processor, the processor:
       associating the plurality of previously received orders in the book memory with at least one of the predefined condition parameters, wherein the predefined condition parameters include at least one parameter for identifying an occurrence of at least one variable value falling within the fixed length payout range before an expiration of the derivative investment instrument;

calculating a zero payout value for orders having the at least one variable value that did not fall within the fixed length payout range before the expiration of the derivative investment instrument;

calculating a greater than zero payout value for orders having at least one variable value that did fall within the fixed length payout range prior to or at the expiration of the derivative investment instrument.

14. The method of claim 13, wherein the fixed length payout range comprises a plurality of segments, and further comprising the processor:

calculating a payout amount for the derivative investment instrument that increases as a value of the variable increases in a first segment of the fixed length payout range;

calculating a payout amount for the derivative investment instrument that decreases as the value of the variable increases in a second segment of the fixed length payout range; and calculating a fixed payout amount for the derivative investment instrument when the value of the variable is in a third segment of the fixed length payout range.

15. The method of claim 14, wherein the variable comprises an underlying asset.

16. The method of claim 14, wherein the variable comprises an underlying commodity.

17. The method of claim 14, wherein the variable comprises an underlying market indicator.

18. The method of claim 14, further comprising transmitting transaction data relating to the derivative investment instruments to market data vendors or market participants over a network.

19. The method of claim 13, wherein the variable comprises an index.

* * * * *